(12) United States Patent
Abovitz

(10) Patent No.: US 11,157,070 B2
(45) Date of Patent: *Oct. 26, 2021

(54) MASSIVE SIMULTANEOUS REMOTE DIGITAL PRESENCE WORLD

(71) Applicant: Magic Leap, Inc., Plantation, FL (US)

(72) Inventor: Rony Abovitz, Plantation, FL (US)

(73) Assignee: Magic Leap, Inc., Plantation, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/831,659

(22) Filed: Mar. 26, 2020

(65) Prior Publication Data

US 2020/0225739 A1 Jul. 16, 2020

Related U.S. Application Data

(63) Continuation of application No. 16/057,518, filed on Aug. 7, 2018, now Pat. No. 10,671,152, which is a
(Continued)

(51) Int. Cl.
*G06F 3/01* (2006.01)
(52) U.S. Cl.
CPC .............. *G06F 3/011* (2013.01); *G06F 3/016* (2013.01); *G06F 3/017* (2013.01);
(Continued)
(58) Field of Classification Search
CPC .......... G06F 3/011; G06F 3/016; G06F 3/017; G06F 15/16; G09G 2340/12;
(Continued)

(56) References Cited

U.S. PATENT DOCUMENTS 6,028,608 A 2/2000 Jenkins
6,118,456 A 9/2000 Cooper
(Continued)

FOREIGN PATENT DOCUMENTS

CN 101295993 A 10/2008
EP 1060772 A2 12/2000
(Continued)

OTHER PUBLICATIONS

"3-jigen CAD to AR yugou [3 dimensional CAD and AR fusion]", Monthly, e Columbus, Japan, TOHO Press, Apr. 28, 2011—with English Translation, vol. 37, 1st Edition, p. 27 (6 pages).
(Continued)

*Primary Examiner* — Nicholas Klicos
(74) *Attorney, Agent, or Firm* — Stephen M. De Klerk

(57) ABSTRACT

Various methods and apparatus are described herein for enabling one or more users to interface with virtual or augmented reality environments. An example system includes a computing network having computer servers interconnected through high bandwidth interfaces to gateways for processing data and/or for enabling communication of data between the servers and one or more local user interface devices. The servers include memory, processing circuitry, and software for designing and/or controlling virtual worlds, as well as for storing and processing user data and data provided by other components of the system. One or more virtual worlds may be presented to a user through a user device for the user to experience and interact. A large number of users may each use a device to simultaneously interface with one or more digital worlds by using the device to observe and interact with each other and with objects produced within the digital worlds.

8 Claims, 8 Drawing Sheets

Related U.S. Application Data continuation of application No. 13/465,682, filed on May 7, 2012, now Pat. No. 10,101,802.

(60) Provisional application No. 61/483,505, filed on May 6, 2011, provisional application No. 61/483,511, filed on May 6, 2011.

(52) U.S. Cl.
CPC ... *A63F 2300/10* (2013.01); *A63F 2300/8082* (2013.01); *G09G 2340/12* (2013.01); *G09G 2340/125* (2013.01); *G09G 2340/14* (2013.01); *G09G 2354/00* (2013.01)

(58) Field of Classification Search
CPC ......... G09G 2340/125; G09G 2340/14; G09G 2354/00; A63F 2300/10; A63F 2300/8082
See application file for complete search history.

(56) References Cited

U.S. PATENT DOCUMENTS

| | | | |
|---|---|---|---|
| 6,298,374 | B1 | 10/2001 | Sasaki |
| 6,329,986 | B1 | 12/2001 | Cheng |
| 6,563,489 | B1 | 5/2003 | Latypov et al. |
| 6,771,294 | B1 | 8/2004 | Pulli et al. |
| 2001/0020943 | A1 | 9/2001 | Hiijiri et al. |
| 2002/0075201 | A1 | 6/2002 | Sauer et al. |
| 2002/0158873 | A1 | 10/2002 | Williamson |
| 2003/0030734 | A1 | 2/2003 | Gibbs et al. |
| 2003/0128210 | A1 | 7/2003 | Muffler et al. |
| 2005/0022133 | A1 | 1/2005 | Sakamoto et al. |
| 2005/0289590 | A1 | 12/2005 | Cheok et al. |
| 2008/0002262 | A1* | 1/2008 | Chirieleison ...... G02B 27/0093 359/630 |
| 2008/0036875 | A1* | 2/2008 | Jones ............ H04N 5/247 348/222.1 |
| 2008/0046226 | A1 | 2/2008 | Massie et al. |
| 2008/0079752 | A1 | 4/2008 | Gates et al. |
| 2009/0054084 | A1 | 2/2009 | Buhrke et al. |
| 2009/0102845 | A1 | 4/2009 | Takemoto |
| 2009/0115784 | A1 | 5/2009 | Tomite et al. |
| 2009/0189974 | A1 | 7/2009 | Deering |
| 2009/0227374 | A1 | 9/2009 | Tirpak et al. |
| 2009/0295738 | A1 | 12/2009 | Chiang |
| 2009/0307608 | A1 | 12/2009 | Kalasapur et al. |
| 2010/0066750 | A1 | 3/2010 | Yu et al. |
| 2010/0164990 | A1 | 7/2010 | Van Doorn |
| 2010/0240454 | A1 | 9/2010 | Xiao |
| 2010/0241998 | A1 | 9/2010 | Latta et al. |
| 2010/0245237 | A1 | 9/2010 | Nakamura |
| 2010/0245387 | A1 | 9/2010 | Bachelder et al. |
| 2010/0309197 | A1 | 12/2010 | Porwal |
| 2010/0321389 | A1 | 12/2010 | Gay et al. |
| 2010/0325154 | A1 | 12/2010 | Schloter et al. |
| 2010/0328344 | A1 | 12/2010 | Mattila et al. |
| 2011/0151955 | A1 | 6/2011 | Nave |
| 2011/0153341 | A1 | 6/2011 | Diaz-Cortes |
| 2011/0319148 | A1 | 12/2011 | Kinnebrew et al. |
| 2012/0019557 | A1 | 1/2012 | Aronsson et al. |
| 2012/0050143 | A1 | 3/2012 | Border et al. |
| 2012/0235886 | A1 | 9/2012 | Border et al. |
| 2012/0249590 | A1* | 10/2012 | Maciocci ............ G06T 15/503 345/633 |
| 2012/0264510 | A1 | 10/2012 | Wigdor et al. |
| 2013/0038601 | A1 | 2/2013 | Han et al. |
| 2013/0044128 | A1* | 2/2013 | Liu .................. G06T 19/006 345/633 |
| 2018/0300098 | A1 | 10/2018 | Vembar et al. |

FOREIGN PATENT DOCUMENTS

| | | |
|---|---|---|
| JP | 11-53288 | 2/1999 |
| JP | 2000-353248 A | 12/2000 |
| RU | 2120664 C1 | 10/1998 |
| WO | 2010/065848 A2 | 6/2010 |

OTHER PUBLICATIONS

Canadian Examination Report dated Dec. 17, 2019, Canadian Patent Application No. 3035118, (4 pages).
Communication Pursuant to Article 94(3) EPC dated Mar. 4, 2016, European Patent Application No. 12781825.0 in the name of Magic Leap Inc., (9 pages).
Decision of Grant of a Patent for Invention, Russian Patent Application No. 2013154098 (with English Translation), (12 pages).
Examination Report dated Oct. 17, 2019, India Patent Application No. 9216/CHENP/2013, (8 pages).
Examiner's Report dated Jan. 18, 2018, Canadian Patent Application No. 2835120, (4 pages).
Extended European Search Report dated Feb. 12, 2019, European Patent Application No. 18200588.4, (6 pages).
Extended European Search Report dated Nov. 12, 2014, European Patent Application No. 12781825.0, (7 pages).
Extended European Search Report dated Sep. 8, 2017, European Patent Application No. 17168274.4, (9 pages).
Final Office Action dated Mar. 30, 2017 with English Translation, Japanese Patent Application No. 2014-509503, (10 pages).
Final Office Action dated Apr. 13, 2017, U.S. Appl. No. 13/465,682, (15 pages).
Final Office Action dated Nov. 2, 2017, U.S. Appl. No. 13/465,682, (22 pages).
Final Office Action dated Sep. 24, 2015, U.S. Appl. No. 13/465,682, (11 pages).
First Examination Report dated Jun. 25, 2018, Australian Patent Application No. 2017204739, (5 pages).
First Examination Report dated Jul. 18, 2016, Australian Patent Application No. 2012253797 in the name of Magic Leap, Inc., (3 pages).
First Office Action dated Jun. 23, 2016, Japanese Patent Application No. 2014-509503 in Japanese with English Translation, (7 pages).
International Preliminary Report on Patentability dated Nov. 12, 2013, International PCT Application No. PCT/US2012/036691 with International Filing Date of May 4, 2012, (10 Pages).
International Search Report and Written Opinion dated Nov. 16, 2012, International PCT Application No. PCT/US2012/036691 with International Filing Date of May 4, 2012, (11 pages).
Non Final Office Action dated Jul. 21, 2017, U.S. Appl. No. 13/465,982, (19 pages).
Non Final Office Action dated Jun. 21, 2016, U.S. Appl. No. 13/465,682, (16 pages).
Non Final Office Action dated May 15, 2014, U.S. Appl. No. 13/465,682, (15 pages).
Non Final Office Action dated Oct. 30, 2019, U.S. Appl. No. 16/057,518, (19 pages).
Notice of Reasons for Rejection dated Nov. 24, 2017 with English translation, Japanese Patent Application No. 2016-227514, (12 pages).
Office Action—Notice of Reasons for Rejection—dated Sep. 6, 2018 with English Translation, Japanese Patent Application No. 2017-110821, ( 7 pages).
Second Examination Report dated Jan. 16, 2019, Australian Patent Application No. 2017204739, (3 pages).
Cheok, Adrian D. et al., "Touch-space: Mixed reality game space based on ubiquitous, tangible ands social computing", Personal and Ubiquitous Computing, vol. 6, No. 5, Dec. 1, 2012, XP055022556, ISSN: 167-4909, DOI: 1007/s007790200047, pp. 430-442.
Feth, D. et al., "Performance related energy exchange in haptic human-human interaction in a shared virtual object manipulation task", Eurohaptics Conference, 2009 and Symposium on Haptic

(56) References Cited

OTHER PUBLICATIONS

Interfaces for Virtual Environment and Teleoperator Systems, World HAPTCS 2009. Third Joint, IEEE, Pscataway, NJ, USA, March 18, 2009, 338-343.

Kawade, Hiroshi, "Development of AR-based information presentation device considering interaction with real objects and virtual objects", Technical reports of the institute of image information and television engineers Japan, The institute of image information and television engineers, Feb. 14, 2011, vol. 35, No. 9, pp. 59-63.

Wagner, Daniel et al., "Muddleware for Prototyping Mixed Reality Multiuser Games", Virtual Reality Conference, 2007. VR '07 IEEE, IEEE, PI, Mar. 1, 2007, XP03108320, ISBN:978-1-4244-0905-1, 235-238.

* cited by examiner

MASSIVE SIMULTANEOUS REMOTE DIGITAL PRESENCE WORLD

CROSS-REFERENCE TO RELATED APPLICATIONS

The application is a continuation of U.S. patent application Ser. No. 16/057,518, filed on Aug. 7, 2018, which is a continuation of U.S. patent application Ser. No. 13/465,682, filed on May 7, 2012 now U.S. Pat. No. 10,101,802, which pursuant to 35 U.S.C. § 119(e), claims priority from and the benefit of, and hereby incorporates by reference for all purposes, U.S. Provisional Patent Application Ser. No. 61/483,505, filed May 6, 2011, and U.S. Provisional Patent Application Ser. No. 61/483,511, filed May 6, 2011. This application also claims priority pursuant to 35 U.S.C. § 119(a) to PCT Application Serial No. PCT/US2012/036681, filed May 4, 2012.

FIELD OF THE INVENTION

This invention generally relates to methods and apparatus for enabling interactive virtual or augmented reality environments for multiple users.

BACKGROUND

Virtual and augmented reality environments are generated by computers using, in part, data that describes the environment. This data may describe, for example, various objects with which a user may sense and interact with. Examples of these objects include objects that are rendered and displayed for a user to see, audio that is played for a user to hear, and tactile (or haptic) feedback for a user to feel. Users may sense and interact with the virtual and augmented reality environments through a variety of visual, auditory and tactical means.

SUMMARY

The present disclosure describes various systems and methods for enabling one or more users to interface with or participate in virtual or augmented reality environments.

In one exemplary embodiment, a system includes a computing network having computer servers interconnected through high bandwidth interfaces to gateways for processing data and/or for enabling communication of data between the servers and one or more local user interface devices. The servers include memory, processing circuitry, and software for designing and/or controlling virtual worlds, as well as for storing and processing user data and data provided by other components of the system. One or more virtual worlds may be presented to a user through a user device for the user to experience and interact. A large number of users may each use a device to simultaneously interface with one or more digital worlds by using the device to observe and interact with each other and with objects produced within the digital worlds.

Examples of user devices include a smart phone, tablet device, heads-up display (HUD), gaming console, or generally any other device capable of communicating data and generating or communicating an interface to the user to see, hear and/or touch. Generally, the user device will include a processor for executing program code stored in memory on the device, coupled with a visual display, and a communications interface. The interface enables a visual, audible, and/or physical interaction between the user and a digital world, including other users and objects (real or virtual) presented to the user. In one embodiment, the user device comprises a head-mounted display system having an interface, user-sensing system, environment-sensing system, and a processor.

The foregoing and other features and advantages of the present disclosure will become further apparent from the following detailed description of exemplary embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF DRAWINGS

Embodiments are illustrated by way of example in the accompanying figures not necessarily drawn to scale, in which like numbers indicate similar parts, and in which.

DETAILED DESCRIPTION OF THE EMBODIMENTS

Figure 1:
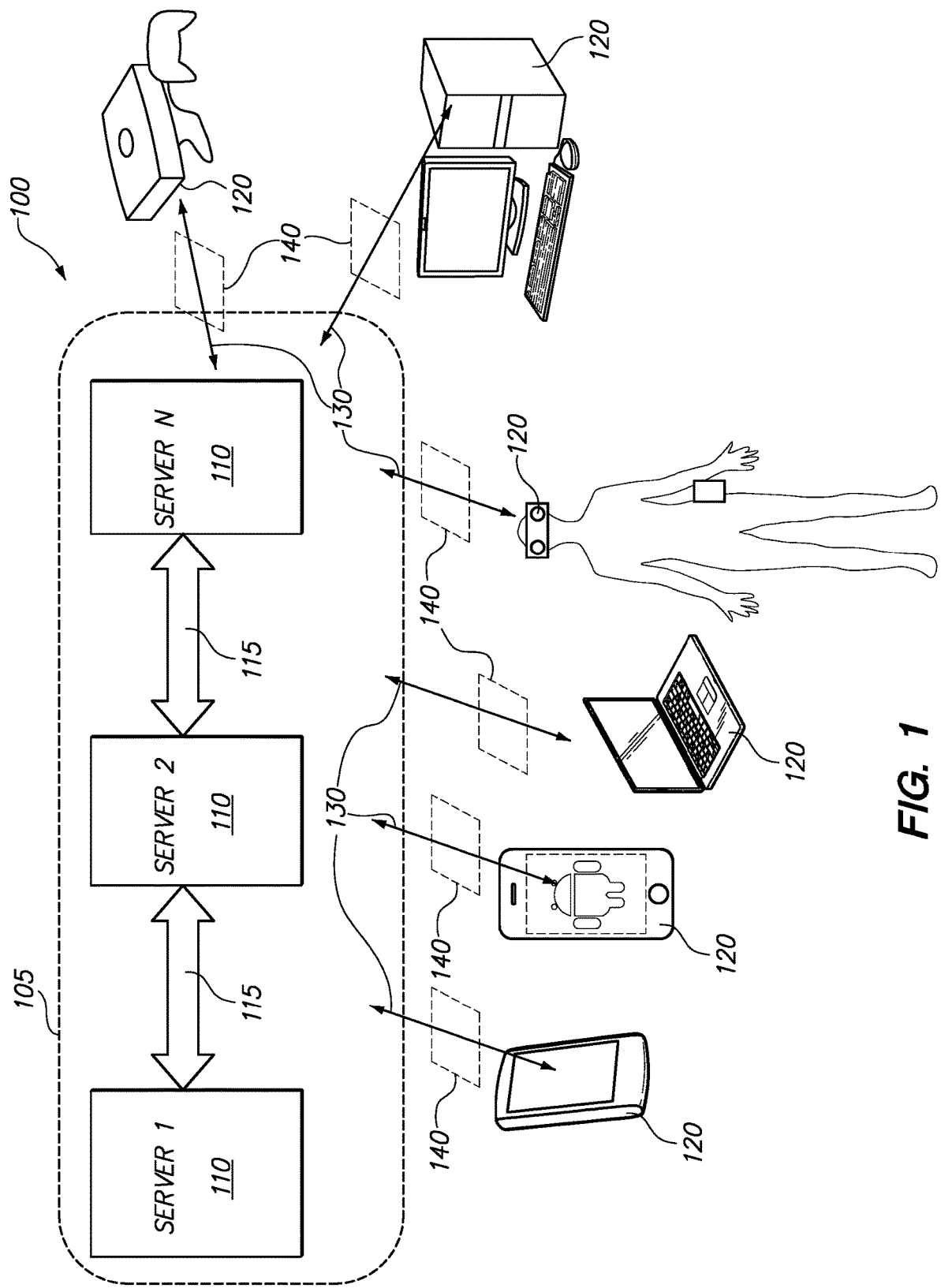
FIG. 1 illustrates a representative embodiment of the disclosed system for enabling interactive virtual or augmented reality environments for multiple users.

Referring to FIG. 1, system 100 is representative hardware for implementing processes described below. This representative system comprises a computing network 105 comprised of one or more computer servers 110 connected through one or more high bandwidth interfaces 115. The servers in the computing network need not be co-located.

The one or more servers 110 each comprise one or more processors for executing program instructions. The servers also include memory for storing the program instructions and data that is used and/or generated by processes being carried out by the servers under direction of the program instructions.

The computing network 105 communicates data between the servers 110 and between the servers and one or more user devices 120 over one or more data network connections 130. Examples of such data networks include, without limitation, any and all types of public and private data networks, both mobile and wired, including for example the interconnection of many of such networks commonly referred to as the Internet. No particular media, topology or protocol is intended to be implied by the figure.

User devices are configured for communicating directly with computing network 105, or any of the servers 110. Alternatively, user devices 120 communicate with the remote servers 110, and, optionally, with other user devices locally, through a specially programmed, local gateway 140 for processing data and/or for communicating data between the network 105 and one or more local user devices 120.

As illustrated, gateway 140 is implemented as a separate hardware component, which includes a processor for executing software instructions and memory for storing software instructions and data. The gateway has its own wired and/or wireless connection to data networks for communicating with the servers 110 comprising computing network 105. Alternatively, gateway 140 can be integrated with a user device 120, which is worn or carried by a user. For example, the gateway 140 may be implemented as a downloadable software application installed and running on a processor included in the user device 120. The gateway 140 provides, in one embodiment, one or more users access to the computing network 105 via the data network 130.

Servers 110 each include, for example, working memory and storage for storing data and software programs, microprocessors for executing program instructions, graphics processors and other special processors for rendering and generating graphics, images, video, audio and multi-media files. Computing network 105 may also comprise devices for storing data that is accessed, used or created by the servers 110.

Software programs running on the servers and optionally user devices 120 and gateways 140, are used to generate digital worlds (also referred to herein as virtual worlds) with which users interact with user devices 120. A digital world is represented by data and processes that describe and/or define virtual, non-existent entities, environments, and conditions that can be presented to a user through a user device 120 for users to experience and interact with. For example, some type of object, entity or item that will appear to be physically present when instantiated in a scene being viewed or experienced by a user may include a description of its appearance, its behavior, how a user is permitted to interact with it, and other characteristics. Data used to create an environment of a virtual world (including virtual objects) may include, for example, atmospheric data, terrain data, weather data, temperature data, location data, and other data used to define and/or describe a virtual environment. Additionally, data defining various conditions that govern the operation of a virtual world may include, for example, laws of physics, time, spatial relationships and other data that may be used to define and/or create various conditions that govern the operation of a virtual world (including virtual objects).

The entity, object, condition, characteristic, behavior or other feature of a digital world will be generically referred to herein, unless the context indicates otherwise, as an object (e.g., digital object, virtual object, rendered physical object, etc.). Objects may be any type of animate or inanimate object, including but not limited to, buildings, plants, vehicles, people, animals, creatures, machines, data, video, text, pictures, and other users. Objects may also be defined in a digital world for storing information about items, behaviors, or conditions actually present in the physical world. The data that describes or defines the entity, object or item, or that stores its current state, is generally referred to herein as object data. This data is processed by the servers 110 or, depending on the implementation, by a gateway 140 or user device 120, to instantiate an instance of the object and render the object in an appropriate manner for the user to experience through a user device.

Programmers who develop and/or curate a digital world create or define objects, and the conditions under which they are instantiated. However, a digital world can allow for others to create or modify objects. Once an object is instantiated, the state of the object may be permitted to be altered, controlled or manipulated by one or more users experiencing a digital world.

For example, in one embodiment, development, production, and administration of a digital world is generally provided by one or more system administrative programmers. In some embodiments, this may include development, design, and/or execution of story lines, themes, and events in the digital worlds as well as distribution of narratives through various forms of events and media such as, for example, film, digital, network, mobile, augmented reality, and live entertainment. The system administrative programmers may also handle technical administration, moderation, and curation of the digital worlds and user communities associated therewith, as well as other tasks typically performed by network administrative personnel.

Users interact with one or more digital worlds using some type of a local computing device, which is generally designated as a user device 120. Examples of such user devices include, but are not limited to, a smart phone, tablet device, heads-up display (HUD), gaming console, or any other device capable of communicating data and providing an interface or display to the user, as well as combinations of such devices. In some embodiments, the user device 120 may include, or communicate with, local peripheral or input/output components such as, for example, a keyboard, mouse, joystick, gaming controller, haptic interface device, motion capture controller, audio equipment, voice equipment, projector system, 3D display, and holographic 3D contact lens.

Figure 2:
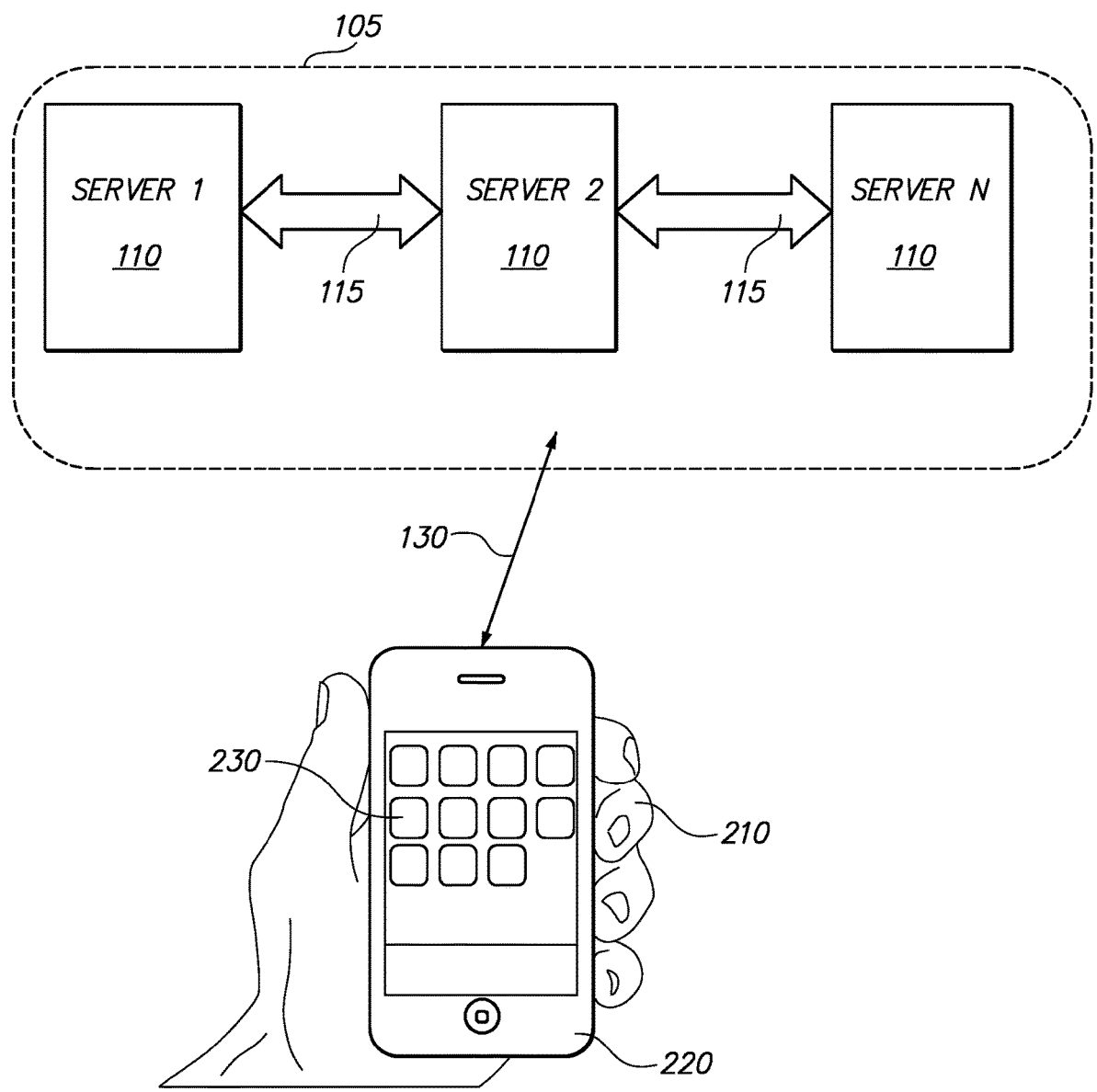
FIG. 2 illustrates an example of a user device for interacting with the system illustrated in FIG. 1.

An example of a user device 120 for interacting with the system 100 is illustrated in FIG. 2. In the example embodiment shown in FIG. 2, a user 210 may interface one or more digital worlds through a smart phone 220. The gateway is implemented by a software application 230 stored on and running on the smart phone 220. In this particular example, the data network 130 includes a wireless mobile network connecting the user device (i.e., smart phone 220) to the computer network 105.

In one implementation of preferred embodiment, system 100 is capable of supporting a large number of simultaneous users (e.g., millions of users), each interfacing with the same digital world, or with multiple digital worlds, using some type of user device 120.

The user device provides to the user an interface for enabling a visual, audible, and/or physical interaction between the user and a digital world generated by the servers 110, including other users and objects (real or virtual) presented to the user. The interface provides the user with a rendered scene that can be viewed, heard or otherwise sensed, and the ability to interact with the scene in real-time. The manner in which the user interacts with the rendered scene may be dictated by the capabilities of the user device. For example, if the user device is a smart phone, the user interaction may be implemented by a user contacting a touch screen. In another example, if the user device is a computer or gaming console, the user interaction may be implemented using a keyboard or gaming controller. User devices may include additional components that enable user interaction such as sensors, wherein the objects and information (including gestures) detected by the sensors may be provided as input representing user interaction with the virtual world using the user device.

The rendered scene can be presented in various formats such as, for example, two-dimensional or three-dimensional visual displays (including projections), sound, and haptic or tactile feedback. The rendered scene may be interfaced by the user in one or more modes including, for example, augmented reality, virtual reality, and combinations thereof. The format of the rendered scene, as well as the interface modes, may be dictated by one or more of the following: user device, data processing capability, user device connectivity, network capacity and system workload. Having a large number of users simultaneously interacting with the digital worlds, and the real-time nature of the data exchange, is enabled by the computing network 105, servers 110, the gateway component 140 (optionally), and the user device 120.

In one example, the computing network 105 1s comprised of a large-scale computing system having single and/or multi-core servers (i.e., servers 110) connected through high-speed connections (e.g., high bandwidth interfaces 115). The computing network 105 may form a cloud or grid network. Each of the servers includes memory, or is coupled with computer-readable memory for storing software for implementing data to create, design, alter, or process objects of a digital world. These objects and their instantiations may be dynamic, come in and out of existence, change over time, and change in response to other conditions. Examples of dynamic capabilities of the objects are generally discussed herein with respect to various embodiments. In some embodiments, each user interfacing the system 100 may also be represented as an object, and/or a collection of objects, within one or more digital worlds.

The servers 110 within the computing network 105 also store computational state data for each of the digital worlds. The computational state data (also referred to herein as state data) may be a component of the object data, and generally defines the state of an instance of an object at a given instance in time. Thus, the computational state data may change over time and may be impacted by the actions of one or more users and/or programmers maintaining the system 100. As a user impacts the computational state data (or other data comprising the digital worlds), the user directly alters or otherwise manipulates the digital world. If the digital world is shared with, or interfaced by, other users, the actions of the user may affect what is experienced by other users interacting with the digital world. Thus, in some embodiments, changes to the digital world made by a user will be experienced by other users interfacing with the system 100.

The data stored in one or more servers 110 within the computing network 105 is, in one embodiment, transmitted or deployed at a high-speed, and with low latency, to one or more user devices 120 and/or gateway components 140. In one embodiment, object data shared by servers may be complete or may be compressed, and contain instructions for recreating the full object data on the user side, rendered and visualized by the user's local computing device (e.g., gateway 140 and/or user device 120). Software running on the servers 110 of the computing network 105 may, in some embodiments, adapt the data it generates and sends to a particular user's device 120 for objects within the digital world (or any other data exchanged by the computing network 105) as a function of the user's specific device and bandwidth. For example, when a user interacts with a digital world through a user device 120, a server 110 may recognize the specific type of device being used by the user, the device's connectivity and/or available bandwidth between the user device and server, and appropriately size and balance the data being delivered to the device to optimize the user interaction. An example of this may include reducing the size of the transmitted data to a low resolution quality, so that the data may be displayed on a particular user device having a low resolution display. In a preferred embodiment, the computing network 105 and/or gateway component 140 deliver data to the user device 120 at a rate sufficient to present an interface operating at 15 frames/second or higher, and at a resolution that is high definition quality or greater.

The gateway 140 provides local connection to the computing network 105 for one or more users. In some embodiments, it may be implemented by a downloadable software application that runs on the user device 120 or another local device, such as that shown in FIG. 2. In other embodiments, it may be implemented by a hardware component (with appropriate software/firmware stored on the component, the component having a processor) that is either in communication with, but not incorporated with or attracted to, the user device 120, or incorporated with the user device 120. The gateway 140 communicates with the computing network 105 via the data network 130, and provides data exchange between the computing network 105 and one or more local user devices 120. As discussed in greater detail below, the gateway component 140 may include software, firmware, memory, and processing circuitry, and may be capable of processing data communicated between the network 105 and one or more local user devices 120.

In some embodiments, the gateway component 140 monitors and regulates the rate of the data exchanged between the user device 120 and the computer network 105 to allow optimum data processing capabilities for the particular user device 120. For example, in some embodiments, the gateway 140 buffers and downloads both static and dynamic aspects of a digital world, even those that are beyond the field of view presented to the user through an interface connected with the user device. In such an embodiment, instances of static objects (structured data, software implemented methods, or both) may be stored in memory (local to the gateway component 140, the user device 120, or both) and are referenced against the local user's current position, as indicated by data provided by the computing network 105 and/or the user's device 120. Instances of dynamic objects, which may include, for example, intelligent software agents and objects controlled by other users and/or the local user, are stored in a high-speed memory buffer. Dynamic objects representing a two-dimensional or three-dimensional object within the scene presented to a user can be, for example, broken down into component shapes, such as a static shape that is moving but is not changing, and a dynamic shape that is changing. The part of the dynamic object that is changing can be updated by a real-time, threaded high priority data stream from a server 110, through computing network 105, managed by the gateway component 140. As one example of a prioritized threaded data stream, data that is within a 60 degree field-of-view of the user's eye may be given higher priority than data that is more peripheral. Another example includes prioritizing dynamic characters and/or objects within the user's field-of-view over static objects in the background.

In addition to managing a data connection between the computing network 105 and a user device 120, the gateway component 140 may store and/or process data that may be presented to the user device 120. For example, the gateway component 140 may, in some embodiments, receive compressed data describing, for example, graphical objects to be rendered for viewing by a user, from the computing network 105 and perform advanced rendering techniques to alleviate the data load transmitted to the user device 120 from the computing network 105. In another example, in which gateway 140 is a separate device, the gateway 140 may store and/or process data for a local instance of an object rather than transmitting the data to the computing network 105 for processing.

Figure 3:
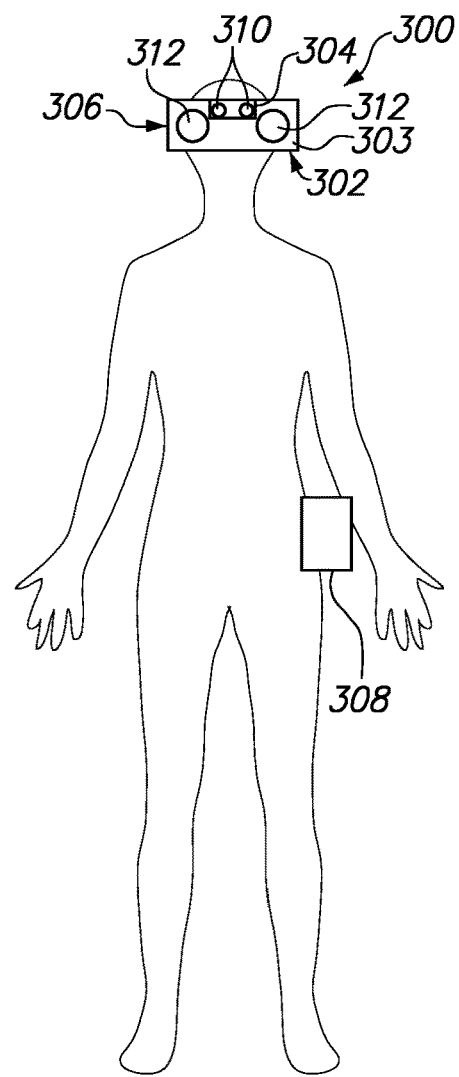
FIG. 3 illustrates an example embodiment of a mobile, wearable user device.

Referring now also to FIG. 3, the digital worlds may be experienced by one or more users in various formats that may depend upon the capabilities of the user's device. In some embodiments, the user device 120 may include, for example, a smart phone, tablet device, heads-up display (HUD), gaming console, or a wearable device. Generally, the user device will include a processor for executing program code stored in memory on the device, coupled with a display, and a communications interface. An example embodiment of a user device is illustrated in FIG. 3, wherein the user device comprises a mobile, wearable device, namely a head-mounted display system 300. In accordance with an embodiment of the present disclosure, the head-mounted display system 300 includes a user interface 302, user-sensing system 304, environment-sensing system 306, and a processor 308. Although the processor 308 is shown in FIG. 3 as an isolated component separate from the head-mounted system 300, in an alternate embodiment, the processor 308 may be integrated with one or more components of the head-mounted system 300, or may be integrated into other system 100 components such as, for example, the gateway 140.

The user device presents to the user an interface 302 for interacting with and experiencing a digital world. Such interaction may involve the user and the digital world, one or more other users interfacing the system 100, and objects within the digital world. The interface 302 generally provides image and/or audio sensory input (and in some embodiments, physical sensory input) to the user. Thus, the interface 302 may include speakers (not shown) and a display component 303 capable, in some embodiments, of enabling stereoscopic 3D viewing and/or 3D viewing which embodies more natural characteristics of the human vision system. In some embodiments, the display component 303 may comprise a transparent interface (such as a clear OLED) which, when in an "off" setting, enables an optically correct view of the physical environment around the user with little-to-no optical distortion or computing overlay. As discussed in greater detail below, the interface 302 may include additional settings that allow for a variety of visual/interface performance and functionality.

The user-sensing system 304 may include, in some embodiments, one or more sensors 310 operable to detect certain features, characteristics, or information related to the individual user wearing the system 300. For example, in some embodiments, the sensors 310 may include a camera or optical detection/scanning circuitry capable of detecting real-time optical characteristics/measurements of the user such as, for example, one or more of the following: pupil constriction/dilation, angular measurement/positioning of each pupil, spherocity, eye shape (as eye shape changes over time) and other anatomic data. This data may provide, or be used to calculate, information (e.g., the user's visual focal point) that may be used by the head-mounted system 300 and/or interface system 100 to optimize the user's viewing experience. For example, in one embodiment, the sensors 310 may each measure a rate of pupil contraction for each of the user's eyes. This data may be transmitted to the processor 308 (or the gateway component 140 or to a server 110), wherein the data is used to determine, for example, the user's reaction to a brightness setting of the interface display 303. The interface 302 may be adjusted in accordance with the user's reaction by, for example, dimming the display 303 if the user's reaction indicates that the brightness level of the display 303 is too high. The user-sensing system 304 may include other components other than those discussed above or illustrated in FIG. 3. For example, in some embodiments, the user-sensing system 304 may include a microphone for receiving voice input from the user. The user sensing system may also include one or more infrared camera sensors, one or more visible spectrum camera sensors, structured light emitters and/or sensors, infrared light emitters, coherent light emitters and/or sensors, gyros, accelerometers, magnetometers, proximity sensors, GPS sensors, ultrasonic emitters and detectors and haptic interfaces.

The environment-sensing system 306 includes one or more sensors 312 for obtaining data from the physical environment around a user. Objects or information detected by the sensors may be provided as input to the user device. In some embodiments, this input may represent user interaction with the virtual world. For example, a user viewing a virtual keyboard on a desk may gesture with his fingers as if he were typing on the virtual keyboard. The motion of the fingers moving may be captured by the sensors 312 and provided to the user device or system as input, wherein the input may be used to change the virtual world or create new virtual objects. For example, the motion of the fingers may be recognized (using a software program) as typing, and the recognized gesture of typing may be combined with the known location of the virtual keys on the virtual keyboard. The system may then render a virtual monitor displayed to the user (or other users interfacing the system) wherein the virtual monitor displays the text being typed by the user.

The sensors 312 may include, for example, a generally outward-facing camera or a scanner for interpreting scene information, for example, through continuously and/or intermittently projected infrared structured light. The environment-sensing system 306 may be used for mapping one or more elements of the physical environment around the user by detecting and registering the local environment, including static objects, dynamic objects, people, gestures and various lighting, atmospheric and acoustic conditions. Thus, in some embodiments, the environment-sensing system 306 may include image-based 3D reconstruction software embedded in a local computing system (e.g., gateway component 140 or processor 308) and operable to digitally reconstruct one or more objects or information detected by the sensors 312. In one exemplary embodiment, the environment-sensing system 306 provides one or more of the following: motion capture data (including gesture recognition), depth sensing, facial recognition, object recognition, unique object feature recognition, voice/audio recognition and processing, acoustic source localization, noise reduction, infrared or similar laser projection, as well as monochrome and/or color CMOS sensors (or other similar sensors), field-of-view sensors, and a variety of other optical-enhancing sensors. It should be appreciated that the environment-sensing system 306 may include other components other than those discussed above or illustrated in FIG. 3. For example, in some embodiments, the environment-sensing system 306 may include a microphone for receiving audio from the local environment. The user sensing system may also include one or more infrared camera sensors, one or more visible spectrum camera sensors, structure light emitters and/or sensors, infrared light emitters, coherent light emitters and/or sensors gyros, accelerometers, magnetometers, proximity sensors, GPS sensors, ultrasonic emitters and detectors and haptic interfaces.

As mentioned above, the processor 308 may, in some embodiments, be integrated with other components of the head-mounted system 300, integrated with other components of the interface system 100, or may be an isolated device (wearable or separate from the user) as shown in FIG. 3. The processor 308 may be connected to various components of the head-mounted system 300 and/or components of the interface system 100 through a physical, wired connection, or through a wireless connection such as, for example, mobile network connections (including cellular telephone and data networks), Wi-Fi or Bluetooth. The processor 308 may include a memory module, integrated and/or additional graphics processing unit, wireless and/or wired internet connectivity, and codec and/or firmware capable of transforming data from a source (e.g., the computing network 105, the user-sensing system 304, the environment-sensing system 306, or the gateway component 140) into image and audio data, wherein the images/video and audio may be presented to the user via the interface 302.

The processor 308 handles data processing for the various components of the head-mounted system 300 as well as data exchange between the head-mounted system 300 and the gateway component 140 and, in some embodiments, the computing network 105. For example, the processor 308 may be used to buffer and process data streaming between the user and the computing network 105, thereby enabling a smooth, continuous and high fidelity user experience. In some embodiments, the processor 308 may process data at a rate sufficient to achieve anywhere between 8 frames/second at 320×240 resolution to 24 frames/second at high definition resolution (1280×720), or greater, such as 60-120 frames/second and 4k resolution and higher (10k+ resolution and 50,000 frames/second). Additionally, the processor 308 may store and/or process data that may be presented to the user, rather than streamed in real-time from the computing network 105. For example, the processor 308 may, in some embodiments, receive compressed data from the computing network 105 and perform advanced rendering techniques (such as lighting or shading) to alleviate the data load transmitted to the user device 120 from the computing network 105. In another example, the processor 308 may store and/or process local object data rather than transmitting the data to the gateway component 140 or to the computing network 105.

The head-mounted system 300 may, in some embodiments, include various settings, or modes, that allow for a variety of visual/interface performance and functionality. The modes may be selected manually by the user, or automatically by components of the head-mounted system 300 or the gateway component 140. As previously mentioned, one example of head-mounted system 300 includes an "off" mode, wherein the interface 302 provides substantially no digital or virtual content. In the off mode, the display component 303 may be transparent, thereby enabling an optically correct view of the physical environment around the user with little-to-no optical distortion or computing overlay.

In one example embodiment, the head-mounted system 300 includes an "augmented" mode, wherein the interface 302 provides an augmented reality interface. In the augmented mode, the interface display 303 may be substantially transparent, thereby allowing the user to view the local, physical environment. At the same time, virtual object data provided by the computing network 105, the processor 308, and/or the gateway component 140 is presented on the display 303 in combination with the physical, local environment.

Figure 4:
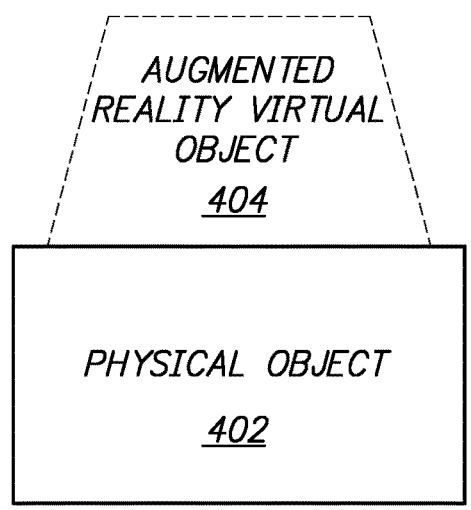
FIG. 4 illustrates an example of objects viewed by a user when the mobile, wearable user device of FIG. 3 is operating in an augmented mode.

FIG. 4 illustrates an example embodiment of objects viewed by a user when the interface 302 is operating in an augmented mode. As shown in FIG. 4, the interface 302 presents a physical object 402 and a virtual object 404. In the embodiment illustrated in FIG. 4, the physical object 402 is a real, physical object existing in the local environment of the user, whereas the virtual object 404 is an object created by the system 100, and displayed via the user interface 302. In some embodiments, the virtual object 404 may be displayed at a fixed position or location within the physical environment (e.g., a virtual monkey standing next to a particular street sign located in the physical environment), or may be displayed to the user as an object located at a position relative to the user interface/display 303 (e.g., a virtual clock or thermometer visible in the upper, left corner of the display 303).

In some embodiments, virtual objects may be made to be cued off of, or trigged by, an object physically present within or outside a user's field of view. Virtual object 404 is cued off, or triggered by, the physical object 402. For example, the physical object 402 may actually be a stool, and the virtual object 404 may be displayed to the user (and, in some embodiments, to other users interfacing the system 100) as a virtual animal standing on the stool. In such an embodiment, the environment-sensing system 306 may use software and/or firmware stored, for example, in the processor 308 to recognize various features and/or shape patterns (captured by the sensors 312) to identify the physical object 402 as a stool. These recognized shape patterns such as, for example, the stool top, may be used to trigger the placement of the virtual object 404. Other examples include walls, tables, furniture, cars, buildings, people, floors, plants, animals—any object which can be seen can be used to trigger an augmented reality experience in some relationship to the object or objects.

In some embodiments, the particular virtual object 404 that is triggered may be selected by the user or automatically selected by other components of the head-mounted system 300 or interface system 100. Additionally, in embodiments in which the virtual object 404 is automatically triggered, the particular virtual object 404 may be selected based upon the particular physical object 402 (or feature thereof) off which the virtual object 404 is cued or triggered. For example, if the physical object is identified as a diving board extending over a pool, the triggered virtual object may be a creature wearing a snorkel, bathing suit, floatation device, or other related items.

In another example embodiment, the head-mounted system 300 may include a "virtual" mode, wherein the interface 302 provides a virtual reality interface. In the virtual mode, the physical environment is omitted from the display 303, and virtual object data provided by the computing network 105, the processor 308, and/or the gateway component 140 is presented on the display 303. The omission of the physical environment may be accomplished by physically blocking the visual display 303 (e.g., via a cover) or through a feature of the interface 302 wherein the display 303 transitions to an opaque setting. In the virtual mode, live and/or stored visual and audio sensory may be presented to the user through the interface 302, and the user experiences and interacts with a digital world (digital objects, other users, etc.) through the virtual mode of the interface 302. Thus, the interface provided to the user in the virtual mode is comprised of virtual object data comprising a virtual, digital world.

Figure 5:
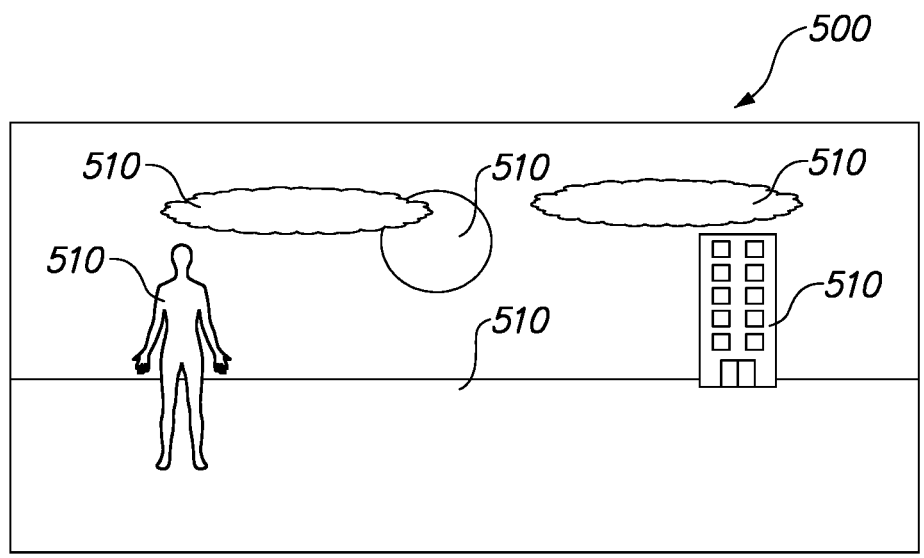
FIG. 5 illustrates an example of objects viewed by a user when the mobile, wearable user device of FIG. 3 is operating in a virtual mode.

FIG. 5 illustrates an example embodiment of a user interface when the head-mounted interface 302 is operating in a virtual mode. As shown in FIG. 5, the user interface presents a virtual world 500 comprised of digital objects 510, wherein the digital objects 510 may include atmosphere, weather, terrain, buildings, and people. Although it is not illustrated in FIG. 5, digital objects may also include, for example, plants, vehicles, animals, creatures, machines, artificial intelligence, location information, and any other object or information defining the virtual world 500.

In another example embodiment, the head-mounted system 300 may include a "blended" mode, wherein various features of the head-mounted system 300 (as well as features of the virtual and augmented modes) may be combined to create one or more custom interface modes. In one example custom interface mode, the physical environment is omitted from the display 303, and virtual object data is presented on the display 303 in a manner similar to the virtual mode. However, in this example custom interface mode, virtual objects may be fully virtual (i.e., they do not exist in the local, physical environment) or they may be real, local, physical objects rendered as a virtual object in the interface 302 in place of the physical object. Thus, in this particular custom mode (referred to herein as a blended virtual interface mode), live and/or stored visual and audio sensory may be presented to the user through the interface 302, and the user experiences and interacts with a digital world comprising fully virtual objects and rendered physical objects.

Figure 6:
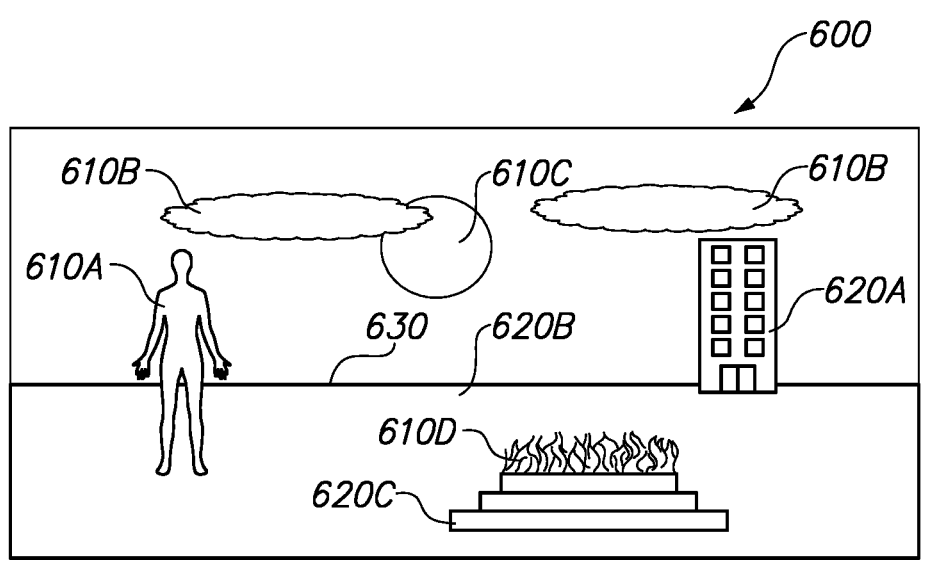
FIG. 6 illustrates an example of objects viewed by a user when the mobile, wearable user device of FIG. 3 is operating in a blended virtual interface mode.

FIG. 6 illustrates an example embodiment of a user interface operating in accordance with the blended virtual interface mode. As shown in FIG. 6, the user interface presents a virtual world 600 comprised of fully virtual objects 610, and rendered physical objects 620 (renderings of objects otherwise physically present in the scene). In accordance with the example illustrated in FIG. 6, the rendered physical objects 620 include a building 620A, ground 620B, and a platform 620C, and are shown with a bolded outline 630 to indicate to the user that the objects are rendered. Additionally, the fully virtual objects 610 include an additional user 610A, clouds 610B, sun 610C, and flames 610D on top of the platform 620C. It should be appreciated that fully virtual objects 610 may include, for example, atmosphere, weather, terrain, buildings, people, plants, vehicles, animals, creatures, machines, artificial intelligence, location information, and any other object or information defining the virtual world 600, and not rendered from objects existing in the local, physical environment. Conversely, the rendered physical objects 620 are real, local, physical objects rendered as a virtual object in the interface 302. The bolded outline 630 represents one example for indicating rendered physical objects to a user. As such, the rendered physical objects may be indicated as such using methods other than those disclosed herein.

In some embodiments, the rendered physical objects 620 may be detected using the sensors 312 of the environment-sensing system 306 (or using other devices such as a motion or image capture system), and converted into digital object data by software and/or firmware stored, for example, in the processing circuitry 308. Thus, as the user interfaces with the system 100 in the blended virtual interface mode, various physical objects may be displayed to the user as rendered physical objects. This may be especially useful for allowing the user to interface with the system 100, while still being able to safely navigate the local, physical environment. In some embodiments, the user may be able to selectively remove or add the rendered physical objects to the interface display 303.

In another example custom interface mode, the interface display 303 may be substantially transparent, thereby allowing the user to view the local, physical environment, while various local, physical objects are displayed to the user as rendered physical objects. This example custom interface mode is similar to the augmented mode, except that one or more of the virtual objects may be rendered physical objects as discussed above with respect to the previous example.

The foregoing example custom interface modes represent a few example embodiments of various custom interface modes capable of being provided by the blended mode of the head-mounted system 300. Accordingly, various other custom interface modes may be created from the various combination of features and functionality provided by the components of the head-mounted system 300 and the various modes discussed above without departing from the scope of the present disclosure.

The embodiments discussed herein merely describe a few examples for providing an interface operating in an off, augmented, virtual, or blended mode, and are not intended to limit the scope or content of the respective interface modes or the functionality of the components of the head-mounted system 300. For example, in some embodiments, the virtual objects may include data displayed to the user (time, temperature, elevation, etc.), objects created and/or selected by the system 100, objects created and/or selected by a user, or even objects representing other users interfacing the system 100. Additionally, the virtual objects may include an extension of physical objects (e.g., a virtual sculpture growing from a physical platform) and may be visually connected to, or disconnected from, a physical object.

The virtual objects may also be dynamic and change with time, change in accordance with various relationships (e.g., location, distance, etc.) between the user or other users, physical objects, and other virtual objects, and/or change in accordance with other variables specified in the software and/or firmware of the head-mounted system 300, gateway component 140, or servers 110. For example, in certain embodiments, a virtual object may respond to a user device or component thereof (e.g., a virtual ball moves when a haptic device is placed next to it), physical or verbal user interaction (e.g., a virtual creature runs away when the user approaches it, or speaks when the user speaks to it), a chair is thrown at a virtual creature and the creature dodges the chair, other virtual objects (e.g., a first virtual creature reacts when it sees a second virtual creature), physical variables such as location, distance, temperature, time, etc. or other physical objects in the user's environment (e.g., a virtual creature shown standing in a physical street becomes flattened when a physical car passes).

The various modes discussed herein may be applied to user devices other than the head-mounted system 300. For example, an augmented reality interface may be provided via a mobile phone or tablet device. In such an embodiment, the phone or tablet may use a camera to capture the physical environment around the user, and virtual objects may be overlaid on the phone/tablet display screen. Additionally, the virtual mode may be provided by displaying the digital world on the display screen of the phone/tablet. Accordingly, these modes may be blended as to create various custom interface modes as described above using the components of the phone/tablet discussed herein, as well as other components connected to, or used in combination with, the user device. For example, the blended virtual interface mode may be provided by a computer monitor, television screen, or other device lacking a camera operating in combination with a motion or image capture system. In this example embodiment, the virtual world may be viewed from the monitor/screen and the object detection and rendering may be performed by the motion or image capture system.

Figure 7:
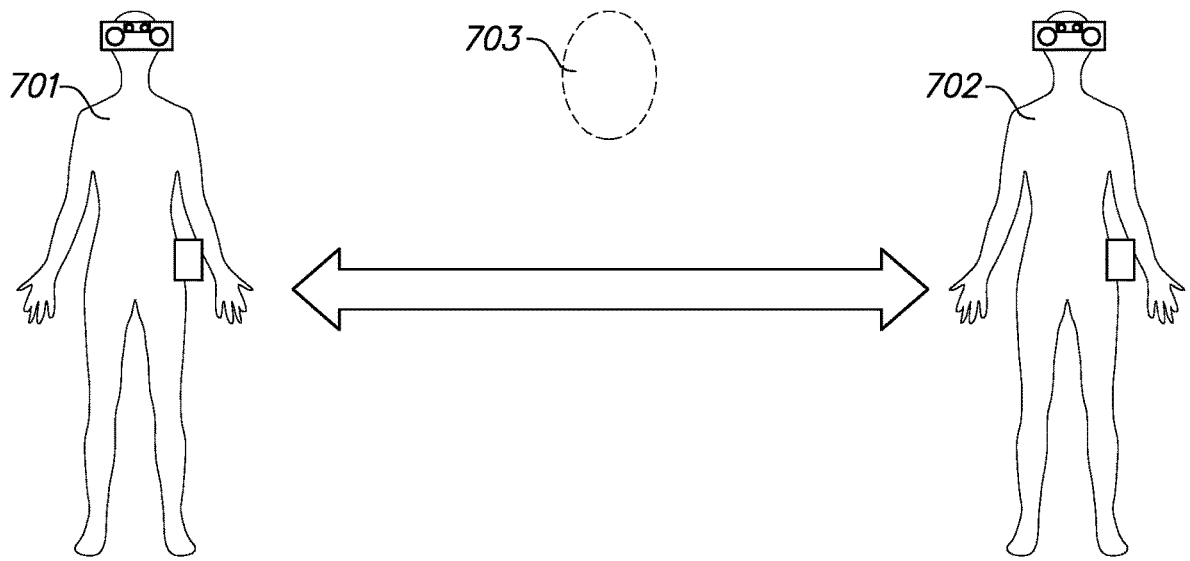
FIG. 7 illustrates an embodiment wherein two users located m different geographical locations each interact with the other user and a common virtual world through their respective user devices.

FIG. 7 illustrates an example embodiment of the present disclosure, wherein two users located in different geographical locations each interact with the other user and a common virtual world through their respective user devices. In this embodiment, the two users 701 and 702 are throwing a virtual ball 703 (a type of virtual object) back and forth, wherein each user is capable of observing the impact of the other user on the virtual world (e.g., each user observes the virtual ball changing directions, being caught by the other user, etc.). Since the movement and location of the virtual objects (i.e., the virtual ball 703) are tracked by the servers 110 in the computing network 105, the system 100 may, in some embodiments, communicate to the users 701 and 702 the exact location and timing of the arrival of the ball 703 with respect to each user. For example, if the first user 701 is located in London, the user 701 may throw the ball 703 to the second user 702 located in Los Angeles at a velocity calculated by the system 100. Accordingly, the system 100 may communicate to the second user 702 (e.g., via email, text message, instant message, etc.) the exact time and location of the ball's arrival. As such, the second user 702 may use his device to see the ball 703 arrive at the specified time and located. One or more users may also use geo-location mapping software (or similar) to track one or more virtual objects as they travel virtually across the globe. An example of this may be a user wearing a 3D head-mounted display looking up in the sky and seeing a virtual plane flying overhead, superimposed on the real world. The virtual plane may be flown by the user, by intelligent software agents (software running on the user device or gateway), other users who may be local and/or remote, and/or any of these combinations.

Figure 8:
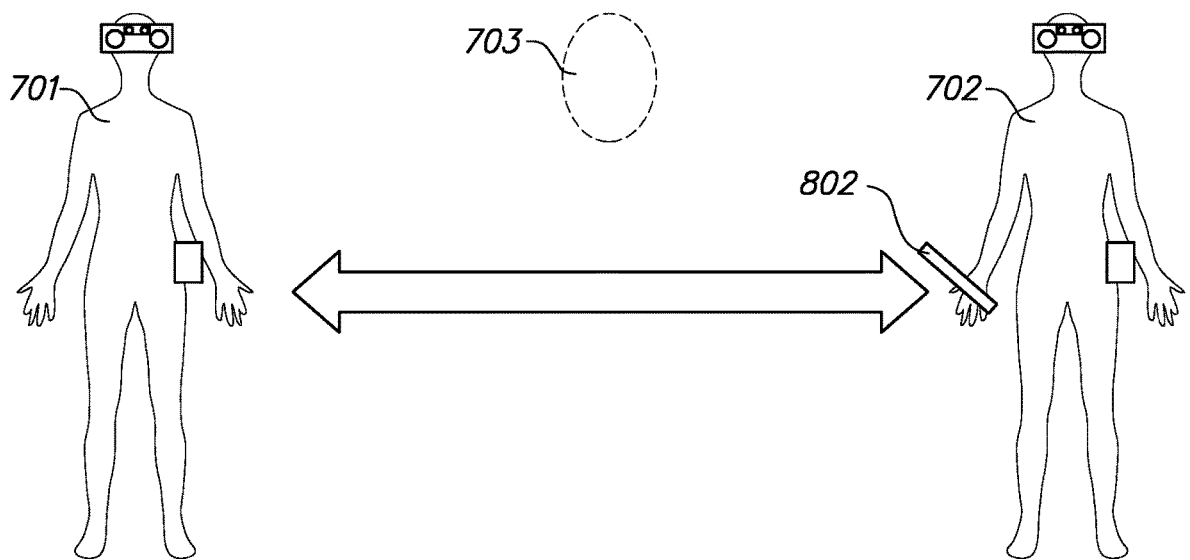
FIG. 8 illustrates an embodiment wherein the embodiment of FIG. 7 1s expanded to include the use of a haptic device.

As previously mentioned, the user device may include a haptic interface device, wherein the haptic interface device provides a feedback (e.g., resistance, vibration, lights, sound, etc.) to the user when the haptic device is determined by the system 100 to be located at a physical, spatial location relative to a virtual object. For example, the embodiment described above with respect to FIG. 7 may be expanded to include the use of a haptic device 802, as shown in FIG. 8. In this example embodiment, the haptic device 802 may be displayed in the virtual world as a baseball bat. When the ball 703 arrives, the user 702 may swing the haptic device 802 at the virtual ball 703. If the system 100 determines that the virtual bat provided by the haptic device 802 made "contact" with the ball 703, then the haptic device 802 may vibrate or provide other feedback to the user 702, and the virtual ball 703 may ricochet off the virtual bat in a direction calculated by the system 100 in accordance with the detected speed, direction, and timing of the ball-to-bat contact.

The disclosed system 100 may, in some embodiments, facilitate mixed mode interfacing, wherein multiple users may interface a common virtual world (and virtual objects contained therein) using different interface modes (e.g., augmented, virtual, blended, etc.). For example, a first user interfacing a particular virtual world in a virtual interface mode may interact with a second user interfacing the same virtual world in an augmented reality mode.

Figure 9A:
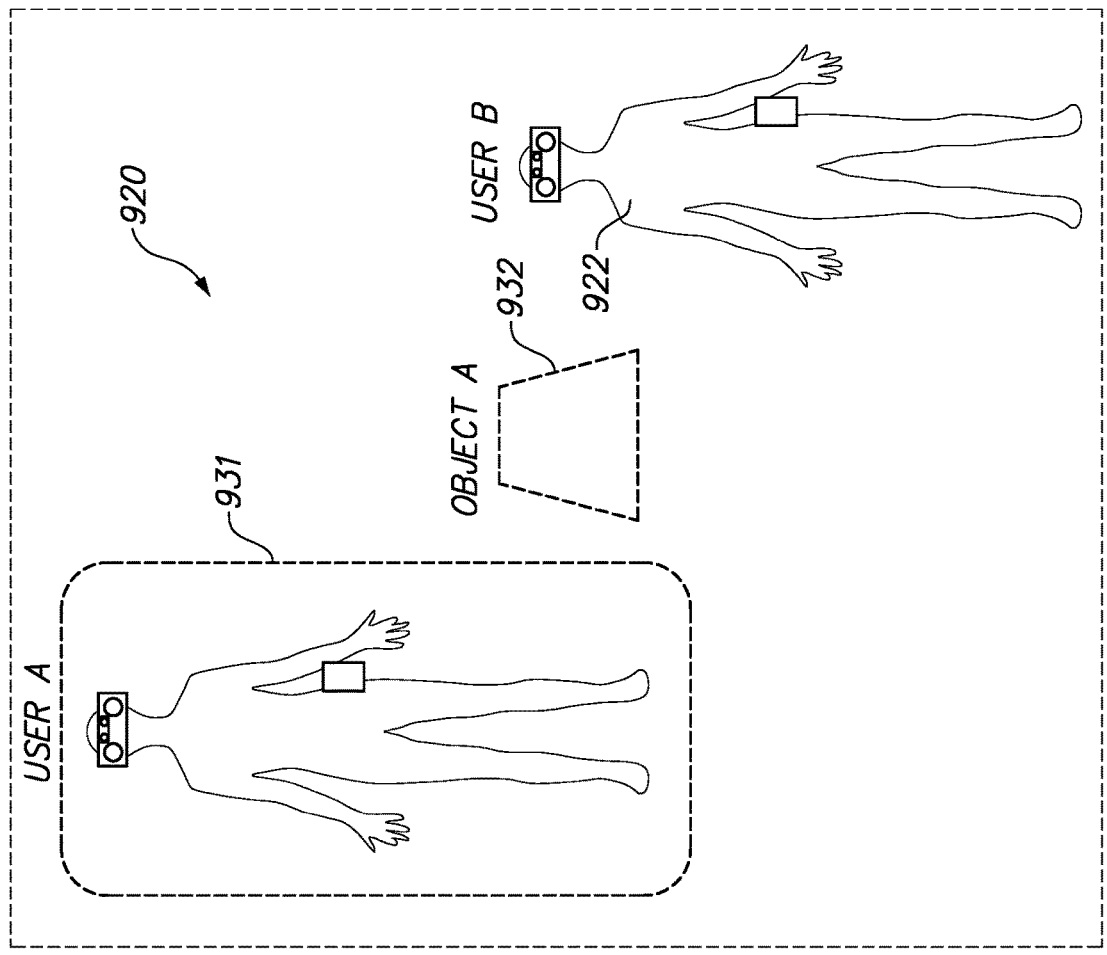
FIG. 9A illustrates an example of mixed mode interfacing, wherein a first user is interfacing a digital world in a blended virtual interface mode and a second user is interfacing the same digital world in a virtual reality mode.
Figure 9A:
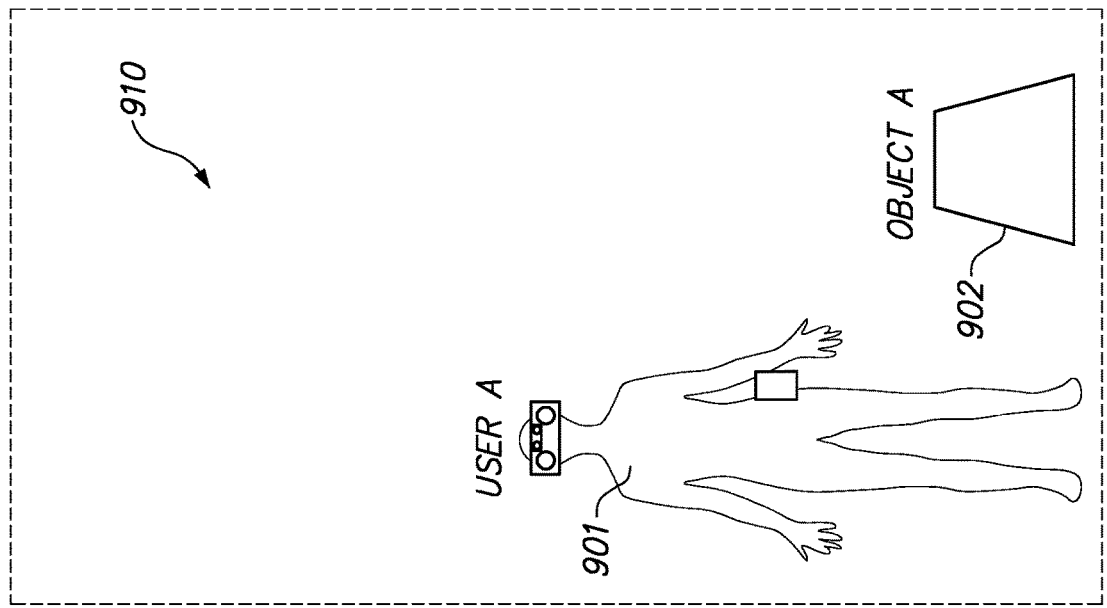

FIG. 9A illustrates an example wherein a first user 901 (interfacing a digital world of the system 100 in a blended virtual interface mode) and first object 902 appear as virtual objects to a second user 922 interfacing the same digital world of the system 100 in a full virtual reality mode. As described above, when interfacing the digital world via the blended virtual interface mode, local, physical objects (e.g., first user 901 and first object 902) may be scanned and rendered as virtual objects in the virtual world. The first user 901 may be scanned, for example, by a motion capture system or similar device, and rendered in the virtual world (by software/firmware stored in the motion capture system, the gateway component 140, the user device 120, system servers 110, or other devices) as a first rendered physical object 931. Similarly, the first object 902 may be scanned, for example, by the environment-sensing system 306 of a head-mounted interface 300, and rendered in the virtual world (by software/firmware stored in the processor 308, the gateway component 140, system servers 110, or other devices) as a second rendered physical object 932. The first user 901 and first object 902 are shown in a first portion 910 of FIG. 9A as physical objects in the physical world. In a second portion 920 of FIG. 9A, the first user 901 and first object 902 are shown as they appear to the second user 922 interfacing the same digital world of the system 100 in a full virtual reality mode: as the first rendered physical object 931 and second rendered physical object 932.

Figure 9B:
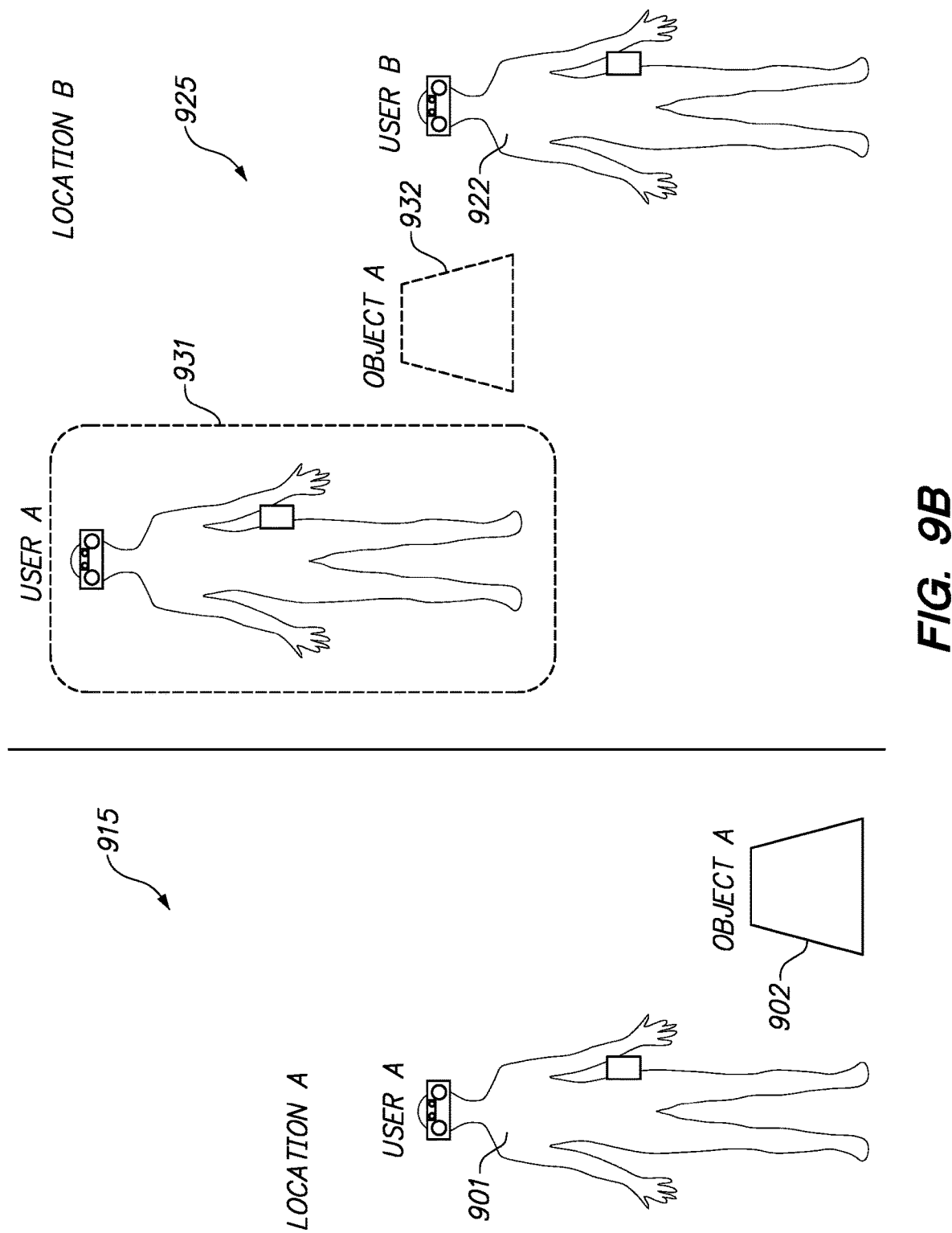
FIG. 9B illustrates another example of mixed mode interfacing, wherein the first user is interfacing a digital world in a blended virtual interface mode and the second user is interfacing the same digital world in an augmented reality mode.

FIG. 9B illustrates another example embodiment of mixed mode interfacing, wherein the first user 901 is interfacing the digital world in a blended virtual interface mode, as discussed above, and the second user 922 is interfacing the same digital world (and the second user's physical, local environment 925) in an augmented reality mode. In the embodiment in FIG. 9B, the first user 901 and first object 902 are located at a first physical location 915, and the second user 922 is located at a different, second physical location 925 separated by some distance from the first location 915. In this embodiment, the virtual objects 931 and 932 may be transposed in real-time (or near real-time) to a location within the virtual world corresponding to the second location 925. Thus, the second user 922 may observe and interact, in the second user's physical, local environment 925, with the rendered physical objects 931 and 932 representing the first user 901 and first object 902, respectively.

Figure 10:
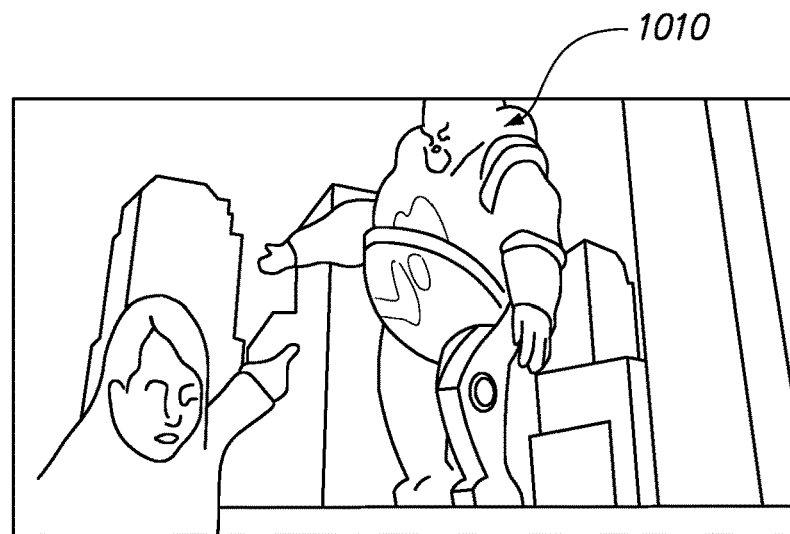
FIG. 10 illustrates an example illustration of a user's view when interfacing the system in an augmented reality mode.

FIG. 10 illustrates an example illustration of a user's view when interfacing the system 100 in an augmented reality mode. As shown in FIG. 10, the user sees the local, physical environment (i.e., a city having multiple buildings) as well as a virtual character 1010 (i.e., virtual object). The position of the virtual character 1010 may be triggered by a 2D visual target (for example, a billboard, postcard or magazine) and/or one or more 3D reference frames such as buildings, cars, people, animals, airplanes, portions of a building, and/or any 3D physical object, virtual object, and/or combinations thereof. In the example illustrated in FIG. 10, the known position of the buildings in the city may provide the registration fiducials and/or information and key features for rendering the virtual character 1010. Additionally, the user's geospatial location (e.g., provided by GPS, attitude/position sensors, etc.) or mobile location relative to the buildings, may comprise data used by the computing network 105 to trigger the transmission of data used to display the virtual character(s) 1010. In some embodiments, the data used to display the virtual character 1010 may comprise the rendered character 1010 and/or instructions (to be carried out by the gateway component 140 and/or user device 120) for rendering the virtual character 1010 or portions thereof. In some embodiments, if the geospatial location of the user is unavailable or unknown, a server 110, gateway component 140, and/or user device 120 may still display the virtual object 1010 using an estimation algorithm that estimates where particular virtual objects and/or physical objects may be located, using the user's last known position as a function of time and/or other parameters. This may also be used to determine the position of any virtual objects should the user's sensors become occluded and/or experience other malfunctions.

Figure 11:
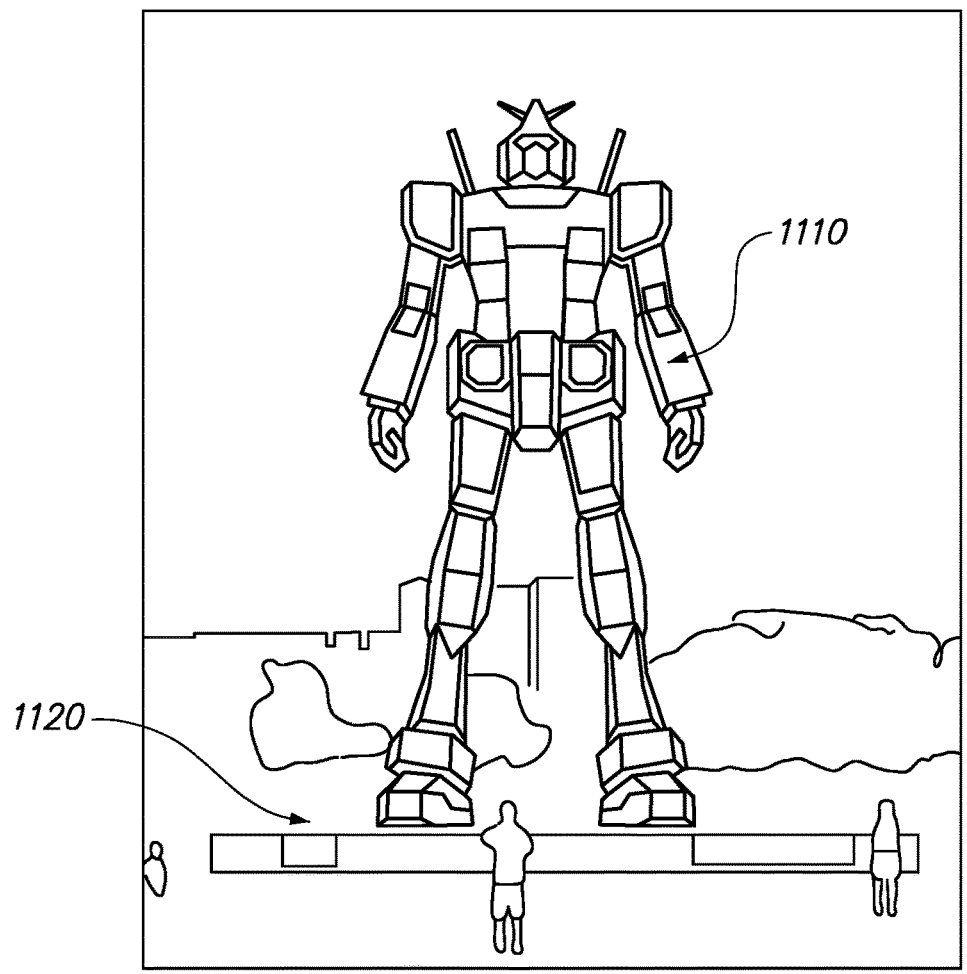
FIG. 11 illustrates an example illustration of a user's view showing a virtual object triggered by a physical object when the user is interfacing the system in an augmented reality mode.

In some embodiments, virtual characters or virtual objects may comprise a virtual statue, wherein the rendering of the virtual statue is triggered by a physical object. For example, referring now to FIG. 11, a virtual statue 1110 may be triggered by a real, physical platform 1120. The triggering of the statue 1110 may be in response to a visual object or feature (e.g., fiducials, design features, geometry, patterns, physical location, altitude, etc.) detected by the user device or other components of the system 100. When the user views the platform 1120 without the user device, the user sees the platform 1120 with no statue 1110. However, when the user views the platform 1120 through the user device, the user sees the statue 1110 on the platform 1120 as shown in FIG. 11. The statue 1110 is a virtual object and, therefore, may be stationary, animated, change over time or with respect to the user's viewing position, or even change depending upon which particular user is viewing the statue 1110. For example, if the user is a small child, the statue may be a dog; yet, if the viewer is an adult male, the statue may be a large robot as shown in FIG. 11. These are examples of user dependent and/or state dependent experiences. This will enable one or more users to perceive one or more virtual objects alone and/or in combination with physical objects and experience customized and personalized versions of the virtual objects. The statue 1110 (or portions thereof) may be rendered by various components of the system including, for example, software/firmware installed on the user device. Using data indicating the location and attitude of the user device, in combination with the registration features of the virtual object (i.e., statue 1110), the virtual object (i.e., statue 1110) forms a relationship with the physical object (i.e., platform 1120). For example, the relationship between one or more virtual objects with one or more physical objects may be a function of distance, positioning, time, geo-location, proximity to one or more other virtual objects, and/or any other functional relationship that includes virtual and/or physical data of any kind. In some embodiments, image recognition software in the user device may further enhance the digital-to-physical object relationship.

The interactive interface provided by the disclosed system and method may be implemented to facilitate various activities such as, for example, interacting with one or more virtual environments and objects, interacting with other users, as well as experiencing various forms of media content, including advertisements, music concerts, and movies. Accordingly, the disclosed system facilitates user interaction such that the user not only views or listens to the media content, but rather, actively participates in and experiences the media content. In some embodiments, the user participation may include altering existing content or creating new content to be rendered in one or more virtual worlds. In some embodiments, the media content, and/or users creating the content, may be themed around a mythopoeia of one or more virtual worlds.

In one example, musicians (or other users) may create musical content to be rendered to users interacting with a particular virtual world. The musical content may include, for example, various singles, EPs, albums, videos, short films, and concert performances. In one example, a large number of users may interface the system 100 to simultaneously experience a virtual concert performed by the musicians.

In some embodiments, the media produced may contain a unique identifier code associated with a particular entity (e.g., a band, artist, user, etc.). The code may be in the form of a set of alphanumeric characters, UPC codes, QR codes, 2D image triggers, 3D physical object feature triggers, or other digital mark, as well as a sound, image, and/or both. In some embodiments, the code may also be embedded with digital media which may be interfaced using the system 100. A user may obtain the code (e.g., via payment of a fee) and redeem the code to access the media content produced by the entity associated with the identifier code. The media content may be added or removed from the user's interface.

The embodiments disclosed herein are provided to illustrate one or more examples of methods and apparatus for enabling interactive virtual or augmented reality environments for multiple users. As such, variations to the methods and apparatus disclosed herein may be made without departing from the scope of the present disclosure as set forth in the claims provided below. For example, although various examples and embodiments are discussed herein with respect to a head-mounted display system, the various examples and embodiments may also apply to other user devices capable of providing the interface or capabilities discussed with respect to those particular embodiments.

What is claimed is:
1. A computer implemented method, comprising:
processing at least a portion of virtual world data;
transmitting the virtual world data to a wearable user device;
monitoring and regulating, by a gateway operatively coupled to, and distinct from the wearable user device, an exchange of virtual world data between the wearable user device and a computer network to allow an optimum data processing of the wearable user device:
presenting a virtual world based on the virtual world data to a user device;
detecting, with a user sensing system connected to the wearable user device comprising a camera, an angular measurement of a pupil of the first user;
receiving sensor data, generated by the camera, for a gesture performed by a user using the user device;
recognizing the gesture;
generating a virtual object in response to the sensor data for the recognized gesture; and
presenting the virtual object to the user device,
wherein at least a portion of the virtual world changes in response to a change in the virtual world data,
wherein, in conjunction with the virtual world changes in response to a change in the virtual world data, at least a portion of the virtual world data is changed in response to a static physical object external to the user sensed by the wearable user device, and wherein the static physical object comprises a mapped object in a physical environment in vicinity of the first user, wherein the optimum data processing comprises prioritizing a plurality of renderings, such that processing a rendering of a dynamic virtual object is prioritized over a rendering of a static virtual object and processing a rendering of data in a field of view having less than sixty degrees forward of the angular measurement of the user's pupil is prioritized over a rendering of data outside the field of view, where the plurality of renderings are performed by the gateway device and transmitted to the wearable user device, and wherein the change in virtual world data represents rendering at least one of the dynamic virtual object and the static virtual object with the static physical object external to the user according to a predetermined relationship.

2. The method of claim 1, wherein the user device is a first user device, further comprising presenting the virtual object on a second user device.

3. The method of claim 1, further comprising:
establishing a relationship between the virtual object and a physical object in the vicinity of the user.

4. The method of claim 1, wherein the user device is a head-worn device.

5. The method of claim 1, further comprising:
obtaining, with an environment-sensing system connected to the wearable user device, data from the physical environment around a user.

6. The method of claim 5, wherein the environment-sensing system detects key features of the static physical object external to the user.

7. A computer implemented method, comprising:
processing at least a portion of virtual world data;
transmitting the virtual world data to a wearable user device for presentation to the first user as the virtual object;
monitoring and regulating an exchange of virtual world data between the wearable user device and a computer network to allow an optimum data processing of the wearable user device;
receiving sensory data, generated by sensors associated with a user device, for a physical object in the vicinity of a user using the user device;
recognizing the object;
in response to the recognition of the object, generating a virtual object based on the virtual world data having a predetermined relationship with the physical object; and
transmitting the virtual object to a display associated with the user device for presentation to the user according to the predetermined relationship,
wherein at least a portion of the virtual world changes in response to a change in the virtual world data,
wherein, in conjunction with the virtual world changes in response to a change in the virtual world data, at least a portion of the virtual world data is changed in response to a physical object sensed by the wearable user device, and wherein the physical object comprises a mapped object in a physical environment in vicinity of the first user, wherein the optimum data processing comprises prioritizing a plurality of renderings, such that processing a rendering of a dynamic virtual object is prioritized over a rendering of a static virtual object and processing a rendering of data in a field of view having less than sixty degrees forward of the angular measurement of the user's pupil is prioritized over a rendering of data outside the field of view, where the plurality of renderings are performed by the gateway device and transmitted to the wearable user device, and wherein the change in virtual world data represents rendering at least one of the dynamic virtual object and the static virtual object with the static physical object external to the user according to a predetermined relationship.

8. A computer implemented method, comprising:
processing at least a portion of virtual world data;
transmitting the virtual world data to a wearable user device for presentation to the first user as a virtual object in a virtual world based on the virtual world data;
monitoring and regulating an exchange of virtual world data between the wearable user device and a computer network to allow an optimum data processing of the wearable user device;
storing data defining a digital world, the data defining one or more objects;
receiving sensor data generated by sensors associated with a plurality of user devices, the sensor data describing at least one physical characteristic of the environment of the user device;
generating, in response to the sensor data, an instance of a predefined object for each of the plurality of users; and
transmitting to the respective ones of the plurality of users the instance of the predefined object generated for the users,
wherein at least a portion of the virtual world changes in response to a change in the virtual world data,
wherein, in conjunction with the virtual world changes in response to a change in the virtual world data, at least a portion of the virtual world data is changed in response to a physical object sensed by the wearable user device, and
wherein the physical object comprises a mapped object in a physical environment in vicinity of the first user;
wherein the optimum data processing comprises prioritizing a plurality of renderings, such that processing a rendering of a dynamic virtual object is prioritized over a rendering of a static virtual object and processing a rendering of data in a field of view having less than sixty degrees forward of the angular measurement of the user's pupil is prioritized over a rendering of data outside the field of view, where the plurality of renderings are performed by the gateway device and transmitted to the wearable user device, and
wherein the change in virtual world data represents rendering at least one of the dynamic virtual object and the static virtual object with the static physical object external to the user according to a predetermined relationship.

* * * * *